US012809233B2

(12) United States Patent
Dilan

(10) Patent No.: US 12,809,233 B2
(45) Date of Patent: Nov. 24, 2026

(54) IMAGING SYSTEM FOR SHOWING THE FRONT IMAGE AND THE BACK IMAGE OF A SUBJECT

(71) Applicant: Vasile Dilan, Kirnacheni (MD)

(72) Inventor: Vasile Dilan, Kirnacheni (MD)

( * ) Notice: Subject to any disclaimer, the term of this patent is extended or adjusted under 35 U.S.C. 154(b) by 219 days.

(21) Appl. No.: 18/721,398

(22) PCT Filed: Jan. 20, 2023

(86) PCT No.: PCT/FR2023/050078
§ 371 (c)(1),
(2) Date: Jun. 18, 2024

(87) PCT Pub. No.: WO2023/139337
PCT Pub. Date: Jul. 27, 2023

(65) Prior Publication Data
US 2026/0153788 A1 Jun. 4, 2026

(30) Foreign Application Priority Data
Jan. 20, 2022 (FR) ................................. FR2200466

(51) Int. Cl.
*G03B 15/12* (2021.01)

(52) U.S. Cl.
CPC .................................. *G03B 15/12* (2013.01)

(58) Field of Classification Search
CPC ........ G03B 15/12; H04N 23/53; H04N 23/63; H04N 23/632; H04N 7/181; H04N 7/183
See application file for complete search history.

(56) References Cited

U.S. PATENT DOCUMENTS

2012/0229616 A1* 9/2012 Koike .................... H04N 7/183
348/E7.085
2018/0173963 A1* 6/2018 Taylor .................... G06V 20/52

FOREIGN PATENT DOCUMENTS

JP 2004357103 A * 12/2004 ............. H04N 23/57
JP 2010016793 A * 1/2010 ............... H04N 7/18
(Continued)

*Primary Examiner* — Nhan T Tran
(74) *Attorney, Agent, or Firm* — Muncy, Geissler, Olds & Lowe, P.C.

(57) ABSTRACT

An imaging system for enabling a subject to view themselves in front and back views includes a location for the subject, an image module having a semi-transparent mirror and a display screen positioned behind the semi-transparent mirror, a camera configured to capture a back image of the subject, and a processor operatively connected to the image module and the camera. The processor displays a front virtual image of the subject through the semi-transparent mirror, determines a height of the subject, deduces a statistical mean elevation of the subject's eyes, and generates a corrected back image from the captured back image corresponding to an image that would have been captured from a corrected camera location positioned at the statistical mean elevation of the subject's eyes. The processor scales the corrected back image to fit within an optical cone of the front virtual image and alternately displays the front virtual image and the corrected back image through the semi-transparent mirror such that the corrected back image substitutes for the front virtual image while maintaining substantially identical apparent dimensions, perspective, and visual orientation.

5 Claims, 3 Drawing Sheets

(56) References Cited

FOREIGN PATENT DOCUMENTS

| | | | | | |
|---|---|---|---|---|---|
| WO | WO-2013178841 | A1 | * | 12/2013 | ............. G09F 13/12 |
| WO | WO-2016162731 | A1 | * | 10/2016 | ............. H04N 7/183 |

* cited by examiner

IMAGING SYSTEM FOR SHOWING THE FRONT IMAGE AND THE BACK IMAGE OF A SUBJECT

FIELD OF THE INVENTION

The present invention relates to an imaging system for presenting the front image and the back image of a subject.

STATE OF THE ART

Various mirror systems exist that enable a subject placed in front of the mirrors to see not only their front, but also their sides, and even their back in the case of a set of reflecting mirrors.

However, these mirror systems only allow the subject standing in front of the mirror to have a rather distorted view of the sides and back. The virtual images given by the mirrors are so optically distorted that they only give a relatively distorted and inaccurate impression of the subject's lateral sides and back. In addition, the distortion and proportions change greatly depending on the position of the subject. Also, the reflection of the image from the back or sides by several mirrors reduces the dimensions of the virtual images through this multiplication and attenuates the shading or modifies the colors.

Moreover, the multiplicity of simultaneous images at different angles and scales, and the fact that even a slight movement of the subject simultaneously creates a multiplicity of moving images, are perceived as particularly annoying effects that make it impossible to see the details of each image accurately and efficiently, and the function of this multiplication of images would be to be able to examine the details and effects of a garment or a posture of the subject.

PURPOSE OF THE INVENTION

The object of the present invention is to create an imaging system that enables a subject standing in front of a mirror to have front and back images that correspond in size, color and orientation of lines and contours, as faithfully and meaningfully as possible, using means that are simple to implement.

DESCRIPTION AND ADVANTAGES OF THE INVENTION

To this end, the invention relates to an imaging system for enabling a subject to see themselves in front view and in back view, characterized in that it comprises a location for the subject, an image module comprising a semi-transparent mirror and, a display screen placed behind the semi-transparent mirror facing the subject standing at the location, a camera looking at the back of the subject standing at the location and taking their back image and a processor managing the operation of the image module and the camera to display the front image of the subject alternately with the back image of the subject, taken by the camera in the image module.

The imaging system according to the invention enables the subject to have an exact chosen image of front and back as well as the intermediate partial images between these two positions or postures.

Observation of the images is no longer disrupted or cluttered by multiple ancillary or peripheral images that move with the slightest movement of the subject. Instead, the subject sees only one image at a time, and the images alternate in the same place and with similar characteristics, so that the observer is not disturbed by multiple confusing movements.

The alternation of images is preferably controlled by the subject, or takes place at a programmed frequency compatible with the purpose of observation.

The frequency of alternation and the duration for which each image is displayed in the image module can be programmed to adapt as flexibly as possible to the desired purpose.

This imaging system has a wide range of applications, from professional applications such as fitting rooms and dressing rooms in theaters, to playful applications at unexpectedly large scales of diffusion.

According to another feature, the image module is connected to the processor so as to alternately display the back image of the subject, which has processed by the processor, to substitute the back image for the front image that is reflected back to the subject by the semi-transparent mirror.

The alternation of the front virtual image and the back real image that has been processed to be substituted for the front image, is particularly important for the "front" observation of images by the subject, who will not be disturbed by a change in the scale, hue or brightness of the images, and will thus be able to accurately evaluate details of the subject's clothing, the visual effect on a spectator (a third party), or the subject's front and back postures.

According to a further advantageous feature, the imaging system comprises a subject lighting system with lighting points distributed to illuminate the subject and connected to the processor so as to activate the lighting points facing the subject and as a function of the image to be displayed in the image module, as a virtual image in the mirror and as a real image on the screen.

Adapting lighting to the exposure or to direct vision also makes it possible to study the effects of lighting or the focus thereof, for example, for an actor or, more generally, a performance artist.

According to a further advantageous feature, the processor applies image processing to modify the angle and the direction of view of the back of the subject to display a real image on the screen, replacing the virtual image.

In this way, the imaging system enables a particularly high degree of adaptation of the image pair, particularly if, according to another feature of the invention, the processor inverts the real image into the displayed image on the screen, giving it the same orientation as that of the virtual mirror image.

BRIEF DESCRIPTION OF THE DRAWINGS

The present invention will be described hereinafter in greater detail with the help of an example of an imaging system which is shown schematically in the attached drawings, wherein.

DESCRIPTION OF AN EMBODIMENT

Figure 1:
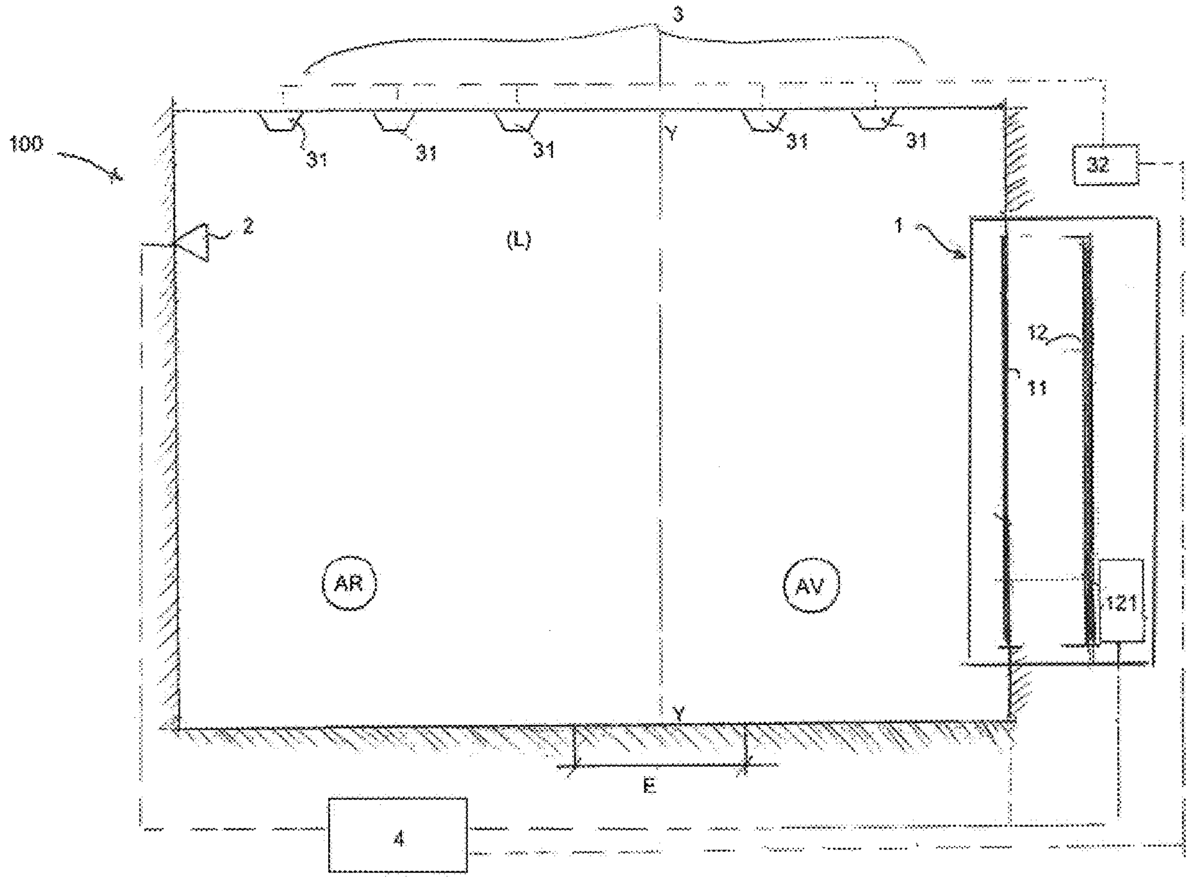
FIG. 1 is a schematic diagram of an imaging system set up in a room.

As shown in FIG. 1, the subject matter of the invention is an imaging system 100 for equipping a room L, such as an exhibition area or a fitting room for fashion accessories or clothing, enabling a subject to examine their outfit from the front and from the back by means of images having aesthetic characteristics (color, shade, size) that are at least similar, so that an equivalent impression is obtained from the front and back images.

This definition encompasses the subject's frontal images when the subject presents themselves strictly from the front, and also when the subject pivots in one direction or the other, as they would do in front of a mirror, in order to check or have a "front" image and back image corresponding to this position.

Depending on the pivot angle assumed by the subject S, the imaging system 100 can display, instead of the front image, a back image corresponding to the same position angle. The subject will have a view that is an exact counterpart, replacing the direct view and preserving at least substantially the same dimensions, so that the two views are substituted homogeneously in terms of size and appearance, which is essential in order for the subject to evaluate and confirm their posture or position.

This alternating presentation of two homogeneous images is particularly important for verifying and evaluating an outfit or a posture, for example, an actor's or singer's outfit, particularly if the outfit has continuity in certain elements between the front and back of a garment, hat or other accessory, without requiring, or in addition to, the intervention of a third party.

FIG. 1 shows an imaging system 100 that is set up in a room L, such as a fitting room or similar room, and comprises an image module 1 facing the location E where the subject S is standing, and a camera 2.

A transverse plane YY passing through location E divides the volume of the room L into a front part AV on the side of image module 1 and a back part AR on the side of camera 2.

Thus, when a subject S is standing at location E, the subject faces the image module 1 and their back is to the camera 2.

The position of the transverse plane YY is thus defined in relation to the subject S, who may be at location E. This position is chosen in the room L, which may itself depend on the dimensions of the available space, so that the subject can comfortably view themselves in the mirror of the image module 1, as detailed hereinbelow. The position behind the subject S may vary greatly according to various requirements, but as the image of the back taken by the camera 2 can be processed, it can be easily adapted to the structure necessary for it to appear in the image module 1, so that its characteristics, in particular its dimensions and if applicable its reversed or non-reversed direction, correspond to the front image.

The room L is equipped with a lighting system 3 with lighting points 31 distributed over the top as shown and, if appropriate, over the sides of the room. The lighting system 3 is connected to a driver 32 that activates lighting points or groups of lighting points to illuminate the subject as required, for example only the front or back of the subject.

The image module 1 is equipped with a driver 121 that controls the operation thereof. The image module 1, the camera 2, and the lighting system 3 may be connected via the drivers 121, 32, to a processor 4 that controls the operation of the imaging system 100.

The system 100 is activated in various ways, either manually or automatically, depending on the desired operating modes and applications.

In the manual command mode, the operation of the system 100 or more precisely of the components 1, 2, 3 thereof is activated by means of a manual command and by means of a general command button, or by means of buttons assigned to the various functions.

In the automatic command mode, the system 100 is activated for example by placing the subject at location E and then executing operations according to a program that is triggered, for example, each time the subject's position or posture at the location E changes by a certain amount.

The camera 2 or the optics thereof can be miniaturized to such an extent as to fit almost invisibly into the room, and it is also possible to hide the camera behind an aperture such as a shutter that is only opened to take the picture.

The image module 1 which, as described above, displays the image of the front part (A) of the subject S or the image of the back part thereof (B), consists of a semi-transparent mirror 11, also called a one-way mirror, facing the location E of the subject, and a display screen 12. This display screen 12 is, for example, a flat-screen television, placed behind the mirror 11. Although the drawing shows a certain distance between the mirror 11 and the screen 12, this distance is really very small, and the screen is positioned directly behind the mirror 11.

The screen 12 is controlled by the driver 121; the mirror 11 displays the image of the subject when the screen 12 is not illuminated; and when the screen 12 is illuminated, the image displayed on the screen appears through the mirror 11 and by its brightness replaces the front image of the mirror 11; the subject S sees their front image when the screen 12 is off and sees their back image when the screen 12 is illuminated.

The camera 2 connected to the processor 4 is managed in accordance with the operation of the screen 12.

The camera 2 sends the back image of the subject, and this image is processed to be homogeneous with the front image in terms of its dimensional characteristics, so that the back image naturally replaces the front image in the image module 1 and the dimensions correspond at least substantially according to the dimensions perceived by the subject at the time, so as to correspond to the same position, for example, when the subject rotates.

The camera image displayed is the image taken immediately before switching the display, so as to correspond exactly to the same posture of the subject as that shown by the front image.

Figure 2:
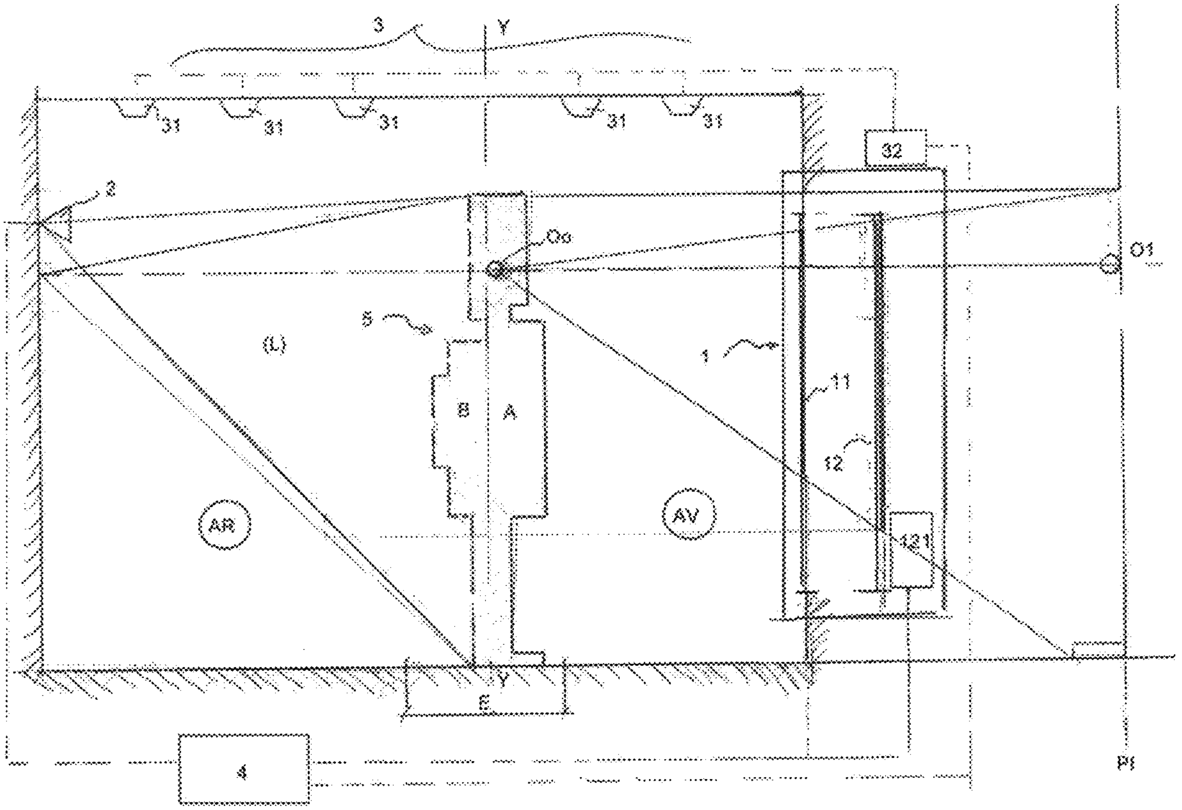
FIG. 2 is the imaging system of FIG. 1 with the subject shown facing the image module.
Figure 3:
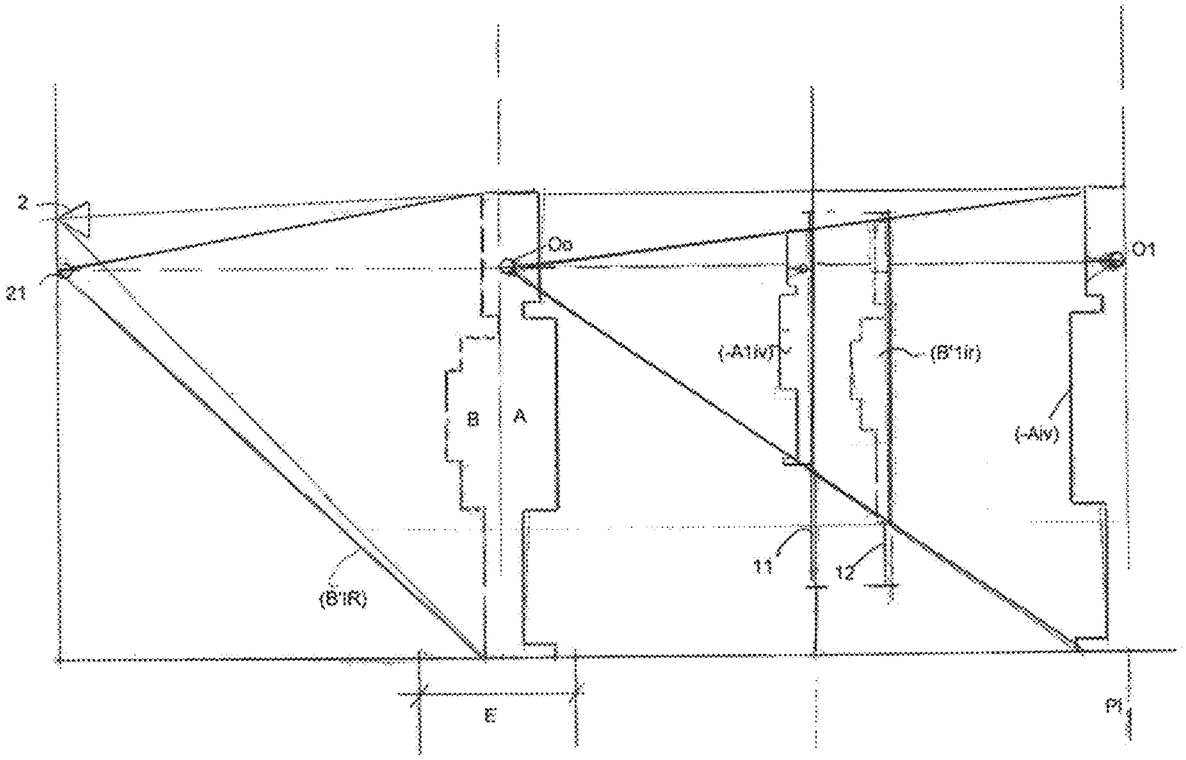
FIG. 3 is a geometric tracing of intermediate images in the image module.

The image processing by the processor 4 can also invert the image displayed on the screen 12 to have the identical left/right orientation as the image in the mirror 11, as will be shown in greater detail with reference to FIGS. 2 and 3.

FIGS. 2 and 3 illustrate the operation of the imaging system by means of geometric drawings.

A subject S, who is depicted cubistically to better identify the various elements of the silhouette, is placed at the location E opposite the image module 1. The transverse plane YY divides the subject into a front part A and a back part B. This division of the subject is geometric, not physical; it simply corresponds to the part A of the subject that appears in the mirror 11 of the image module 1 and to the part B that is the image taken by the camera 2, whatever the orientation of the subject, while the subject can pivot in their location E to see themselves in the appropriate position in the mirror 11 while having a counterpart image from behind.

The eyes of the subject S are at position Oo, which defines the subject's elevation for the geometric construction of the images displayed in the image module 1.

The camera 2 is at an elevation close to the eye level Oo, or at least close to the average eye level of the subjects who will be shown in the system 100, so that the angle or image-taking axis of the camera corresponds substantially to the angle or image-taking axis of the subject S viewing their image in the mirror of the image module 1.

The lighting 3 is controlled so as to illuminate the front part A or the back part B depending on whether the front image or back image is being shown by the image module 1. The position of the camera 2 is aligned with the subject S so that the front image does not clutter the camera image, even though the walls of the room L are of a neutral color and the image of the subject S taken by the camera can be cropped by image processing.

FIG. 3 shows the images seen by the subject s and their geometric composition.

The image of the subject given by the mirror 11 is the front virtual image (-Aiv), which is in the image plane PI. This virtual image is represented in the plane of the mirror 11 by the homothetic representation (-A1*iv*) defined by the intersection with the optical cone that has its vertex at the eye (Oo) and its base at the virtual image (-A1*iv*) of the image plane PI.

The back image B, taken by the camera 2, does not correspond to exactly the same angular orientation of the image-taking axis as that of the vision by eye Oo, for which the eyes O1 are shown in the virtual image.

The image processing performed by the processor 4 consists firstly in causing the image to correspond to the shape B' that it would have if camera 2 were placed at the location 21, which is the elevation of the eye Oo. This elevation can be calculated by analyzing the image taken by the camera, determining the subject's height and deducing the elevation (which corresponds to the statistical mean) of the eyes Oo.

The real image B' ir thus corrected is scaled to obtain the image B'1*ir*, which is inscribed in the optical cone of the image (-Aiv) at its intersection with the screen 12. In this way, the image B'1*iv* displayed on the screen 12 matches the dimensions of the front image (-A1'*v*) as it appears on the mirror 11.

To highlight whether an image is virtual or real, its reference ends with the indication (IV) or (IR) associated respectively with (-A) and (B'1).

In one embodiment, processing the image of part B also comprises inverting the image to obtain an image (-B'1) that has the same inverted orientation as the image (-A1*iv*).

The transition from image (-A1*iv*) to the image (B'1*ir*) or (-B'1*ir*) in the image module 1 is perfectly continuous, without any change in the apparent dimensions. Switching between the two types of image (front image A, back image B) can also be commanded automatically by movement of the subject S changing their orientation or posture at their location E, and successively displaying the front image and the back image.

PRINCIPAL ELEMENTS OF THE DRAWINGS

S Subject
A Front part of subject
B Back part of subject
100 Imaging system
1 Image module
11 Semi-transparent mirror (one-way mirror)
12 Display screen/flat screen
121 Display driver
2 Camera
21 Corrected camera location
3 Lighting system
31 Lighting point

32 Light driver
4 Microprocessor
L Room
AV Front of room
AR Back of room
YY Transverse plane of room
E Location of the subject facing the mirror
PI Planar image of virtual image
-Aiv Virtual image of part A
-A1*iv* Image in mirror plane
B'ir Corrected real image
B'1*ir* Displayed real image
IRB Real image of part B
Oo Eye of subject
01 Virtual image of eye

The invention claimed is:

1. Imaging system for enabling a subject to view themselves in a front view and in a back view, characterized in that it comprises:
- a location for the subject;
- an image module comprising:
- a semi-transparent mirror; and
- a display screen positioned behind the semi-transparent mirror and facing the subject standing at the location;
  - a camera positioned to view a back part of the subject standing at the location and to capture a back image of the subject, and
  - a processor operatively connected to the image module and the camera, wherein the processor is configured to;
- display a front part of the subject as a front virtual image through the semi-transparent mirror;
- receive the back image captured by the camera;
- determine a height of the subject;
- deduce a statistical mean elevation of eyes of the subject from the determined height;
- generate, from the back image captured by the camera, a corrected back image corresponding to an image that would have been captured from a corrected camera location positioned at the statistical mean elevation of the eyes of the subject, thereby causing an image-taking axis of the corrected back image to correspond substantially to a visual orientation of the eyes of the subject;
- scale the corrected back image to obtain a displayed back image that fits within an optical cone of the front virtual image seen by the subject;
- display the displayed back image through display screen via the semi-transparent mirror;
- alternately display the front virtual image and the displayed back image,
  - wherein the displayed back image substitutes for the front virtual image in a common viewing region of the semi-transparent mirror while maintaining substantially identical apparent dimensions, perspective, and visual orientation as perceived by the subject.

2. Imaging system according to claim 1, further comprising:
- a lighting system for the subject comprising lighting points distributed so as to illuminate the subject and connected to the processor to activate the lighting points facing the subject and as a function of the image to be displayed in the image module both as a virtual image on the semi-transparent mirror and as a real image or on the screen, wherein the processor selectively activates the lighting points corresponding to the front part or the back part of the subject according to whether the front virtual image or the displayed back image is being displayed.

3. Imaging system according to claim 1, wherein the processor applies image processing to modify the viewing angle and the viewing direction of the back part of the subject so that the displayed back image corresponds substantially to the visual orientation of the subject's eyes to display on the screen a real image that is substituted for the virtual image that the subject sees.

4. Imaging system according to claim 3, wherein the processor inverts the real image into a display image on the screen so as to give the display image the same orientation as the virtual image in the semi-transparent mirror.

5. The imaging system according to claim 1, wherein the processor is configured to display a back image captured immediately before switching from display of the front virtual image to display of the back image, such that the displayed back image corresponds substantially to the same posture of the subject as the front virtual image.

* * * * *